US012589643B1

(12) United States Patent
Hart et al.

(10) Patent No.: US 12,589,643 B1
(45) Date of Patent: Mar. 31, 2026

(54) INPUT SPLIT HYBRID ARCHITECTURE WITH INDEPENDENT GEAR PILOTING

(71) Applicant: GM GLOBAL TECHNOLOGY OPERATIONS LLC, Detroit, MI (US)

(72) Inventors: James M. Hart, Belleville, MI (US); Shawn H. Swales, Farmington, MI (US); Matthew J. Laskaska, Essexville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/974,020

(22) Filed: Dec. 9, 2024

(51) Int. Cl.
| | |
|---|---|
| *B60K 6/365* | (2007.10) |
| *B60K 6/442* | (2007.10) |
| *F16H 37/04* | (2006.01) |
| *F16H 55/17* | (2006.01) |
| *F16H 57/08* | (2006.01) |
| *F16H 63/34* | (2006.01) |
| *B60K 6/543* | (2007.10) |
| *B62D 63/04* | (2006.01) |

(52) U.S. Cl.
CPC .............. *B60K 6/365* (2013.01); *B60K 6/442* (2013.01); *F16H 37/041* (2013.01); *F16H 55/17* (2013.01); *F16H 57/08* (2013.01); *F16H 63/3425* (2013.01); *B60K 6/543* (2013.01); *B60Y 2200/92* (2013.01); *B62D 63/04* (2013.01); *F16H 2055/176* (2013.01); *F16H 2200/2005* (2013.01)

(58) Field of Classification Search
CPC ........ B60K 6/365; B60K 6/442; B60K 6/543; F16H 37/041; F16H 55/17; F16H 57/08; F16H 63/3425; F16H 2055/176; F16H 2200/2005; B60Y 2200/92; B62D 63/04
See application file for complete search history.

(56) References Cited

U.S. PATENT DOCUMENTS

| | | | |
|---|---|---|---|
| 1,001,261 | A | 8/1911 | Hammer |
| 6,478,705 | B1 | 11/2002 | Holmes |
| 6,527,658 | B2 | 3/2003 | Holmes |
| 7,022,038 | B2 | 4/2006 | Schmidt |

(Continued)

FOREIGN PATENT DOCUMENTS

| | | |
|---|---|---|
| DE | 69737312 T2 | 11/2007 |
| DE | 102014117744 A1 | 3/2016 |

(Continued)

*Primary Examiner* — Farhana Pervin
(74) *Attorney, Agent, or Firm* — Quinn IP Law

(57) ABSTRACT

An assembly includes a planetary gear set located within a housing. The planetary gear set includes a sun gear configured to be driven by a first motor/generator unit and rotate about a first axis, and planet gears in meshing engagement with the sun gear. The planetary gear set also includes a carrier supporting each of the planet gears and a ring gear surrounding the planet gears. The ring gear includes a first portion having a first splined connection and a radially inner set of teeth in meshing engagement with the planet gears and a second portion having a radially outer set of teeth and a second splined connection in engagement with the first splined connection. The planetary gear set also includes first and second bearings each having an inner race fixed relative to the housing and an outer race fixed to the second portion of the ring gear.

20 Claims, 2 Drawing Sheets

(56) References Cited

U.S. PATENT DOCUMENTS

| | | | |
|---|---|---|---|
| 7,217,211 B2 | 5/2007 | Klemen | |
| 7,427,252 B2 | 9/2008 | Holmes | |
| 7,544,141 B2 | 6/2009 | Holmes | |
| 8,317,648 B2 | 11/2012 | Robinette | |
| 8,585,520 B2 | 11/2013 | Turnbull | |
| 8,905,885 B2 | 12/2014 | Yamamoto | |
| 9,840,140 B1 | 12/2017 | Holmes | |
| 9,933,066 B2 | 4/2018 | Sada | |
| 10,017,045 B1 | 7/2018 | Swales | |
| 10,854,933 B2 | 12/2020 | Hao | |
| 2001/0051556 A1* | 12/2001 | Takenaka | B60K 6/36 |
| | | | 903/952 |
| 2003/0064846 A1 | 4/2003 | Klemen et al. | |
| 2015/0045179 A1* | 2/2015 | Okuwaki | B60K 6/445 |
| | | | 180/65.265 |
| 2015/0226297 A1* | 8/2015 | Knoblauch | B60K 17/046 |
| | | | 475/150 |
| 2015/0300461 A1* | 10/2015 | Tamai | B60K 6/40 |
| | | | 475/5 |
| 2015/0314770 A1* | 11/2015 | Kitabatake | B60W 30/184 |
| | | | 180/65.265 |
| 2016/0146332 A1* | 5/2016 | Taniguchi | F16H 57/0479 |
| | | | 903/910 |
| 2016/0265652 A1 | 9/2016 | Nishimine | |
| 2016/0375754 A1* | 12/2016 | Kurosaki | F16H 3/728 |
| | | | 475/5 |
| 2017/0299055 A1* | 10/2017 | Tomita | F16H 63/3433 |
| 2018/0112740 A1* | 4/2018 | Matsumoto | F16H 55/0806 |
| 2025/0242675 A1* | 7/2025 | Yamasaki | B60K 17/16 |

FOREIGN PATENT DOCUMENTS

| | | |
|---|---|---|
| JP | 2009286367 A | 12/2009 |
| JP | 2014024412 A | 2/2014 |
| JP | 2014052065 A | 3/2014 |
| JP | 20220077781 A | 5/2022 |

* cited by examiner

INPUT SPLIT HYBRID ARCHITECTURE WITH INDEPENDENT GEAR PILOTING

INTRODUCTION

The present disclosure relates generally to hybrid motor vehicles. More specifically, aspects of this disclosure relate to an input split hybrid architecture with independent gear piloting.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving power through a manually or automatically shifted multi-speed transmission to the vehicle's final drive system (e.g., differential, axle shafts, road wheels, etc.). Automobiles may be powered by a reciprocating-piston type internal combustion engine (ICE). Hybrid and full electric vehicles, on the other hand, utilize alternative power sources to propel the vehicle and, thus, provide an alternative to a fossil-fuel based engine for tractive power.

SUMMARY

Disclosed herein is an assembly. The assembly includes a housing, a planetary gear set located within the housing. The planetary gear set includes a sun gear configured to be driven by a first motor/generator unit and rotate about a first axis of rotation, planet gears surrounding the sun gear and are in meshing engagement with the sun gear. The planetary gear set also includes a carrier supporting each of the planet gears to rotate around their respective axes in addition to the first axis of rotation and a ring gear surrounding the planet gears. The ring gear includes a first portion having a first splined connection and a radially inner set of teeth in meshing engagement with the planet gears and a second portion having a radially outer set of teeth and a second splined connection in engagement with the first splined connection to allow for axial movement of the first portion relative to the second portion. The planetary gear set also includes at least one bearing having an inner race fixed relative to the housing and an outer race fixed to the second portion of the ring gear.

In one aspect of the disclosure the second portion of the ring gear includes a shoulder adjacent to an end of the second splined connection for engaging the first portion of the ring gear.

In one aspect of the disclosure the assembly includes a second bearing having an inner race fixed relative to the housing and an outer race fixed to the second portion of the ring gear, where the at least one bearing is a first bearing with the first bearing and the second bearing each being ball bearings.

In one aspect of the disclosure the second portion of the ring gear includes a thrust projection extending radially inward relative to the first axis of rotation.

In one aspect of the disclosure the thrust projection includes a first axial surface in engagement with the outer race on the first bearing and a second axial surface in engagement with the outer race on the second bearing.

In one aspect of the disclosure an axial surface facing a first axial direction on the inner race of the first bearing facing is in engagement with a retainer and an axial surface facing a second axial direction on the inner race of the second bearing is in engagement with one of a shim or the housing.

In one aspect of the disclosure the first portion of the ring gear includes parking engagement teeth on a radially outer side relative to the first axis of rotation.

In one aspect of the disclosure the assembly includes a ring piloting hub having a radially outer portion in engagement with the first portion of the ring gear.

In one aspect of the disclosure an axial face of the ring piloting hub facing a first axial direction is configured to engage a bearing assembly located adjacent to the housing.

In one aspect of the disclosure a radially inner portion of the ring piloting hub includes an axially extending flange defining a radially inner surface with a bushing in engagement with the radially inner surface.

In one aspect of the disclosure a radially inner surface of the bushing surrounds a protrusion on the housing and the bushing is a high clearance bushing.

In one aspect of the disclosure the radially outer portion of the ring piloting hub forms a splined connection with a radially inner surface of the first portion of the ring gear.

In one aspect of the disclosure the assembly includes a gear train having a transfer gear in meshing engagement with the radially outer set of teeth on the second portion of the ring gear.

Disclosed herein is a hybrid drive. The hybrid drive includes an engine configured to drive an engine input/output member along a first axis of rotation, a first motor/generator unit configured to drive a first input/output member along the first axis of rotation, and a second motor/generator unit configured to drive a second input/output member along a second axis parallel to and spaced from the first axis. The hybrid drive also includes a planetary gear set located at least partially within a housing including a sun gear configured to be driven by the first input/output member and planet gears surrounding the sun gear and in meshing engagement with the sun gear. The planetary gear set also includes a carrier supporting each of the planet gears to rotate around their respective axes in addition to the first axis of rotation with the carrier configured to be driven by the engine input/output member. The planetary gear set also includes a ring gear surrounding the planet gears that includes a first portion includes a first splined connection and a radially inner set of teeth in meshing engagement with the planet gears and a second portion includes a radially outer set of teeth and a second splined connection in engagement with the first splined connection to allow for axial movement of the first portion relative to the second portion. The hybrid drive also includes at least one bearing that include an inner race fixed relative to the housing and an outer race fixed to the second portion of the ring gear.

Disclosed herein is a vehicle. The vehicle includes a passenger compartment supported by wheels and a hybrid drive assembly configured to drive at least one of the wheels. The hybrid drive includes an engine configured to drive an engine input/output member along a first axis of rotation, a first motor/generator unit configured to drive a first input/output member along the first axis of rotation, and a second motor/generator unit configured to drive a second input/output member along a second axis parallel to and spaced from the first axis. The hybrid drive also includes a planetary gear set located at least partially within a housing including a sun gear configured to be driven by the first input/output member and planet gears surrounding the sun gear and in meshing engagement with the sun gear. The planetary gear set also includes a carrier supporting each of the planet gears to rotate around their respective axes in addition to the first axis of rotation with the carrier configured to be driven by the engine input/output member. The planetary gear set also includes a ring gear surrounding the planet gears that includes a first portion includes a first splined connection and a radially inner set of teeth in meshing engagement with the planet gears and a second portion includes a radially outer set of teeth and a second splined connection in engagement with the first splined connection to allow for axial movement of the first portion relative to the second portion. The hybrid drive also includes at least one bearing that include an inner race fixed relative to the housing and an outer race fixed to the second portion of the ring gear.

Figure 1:
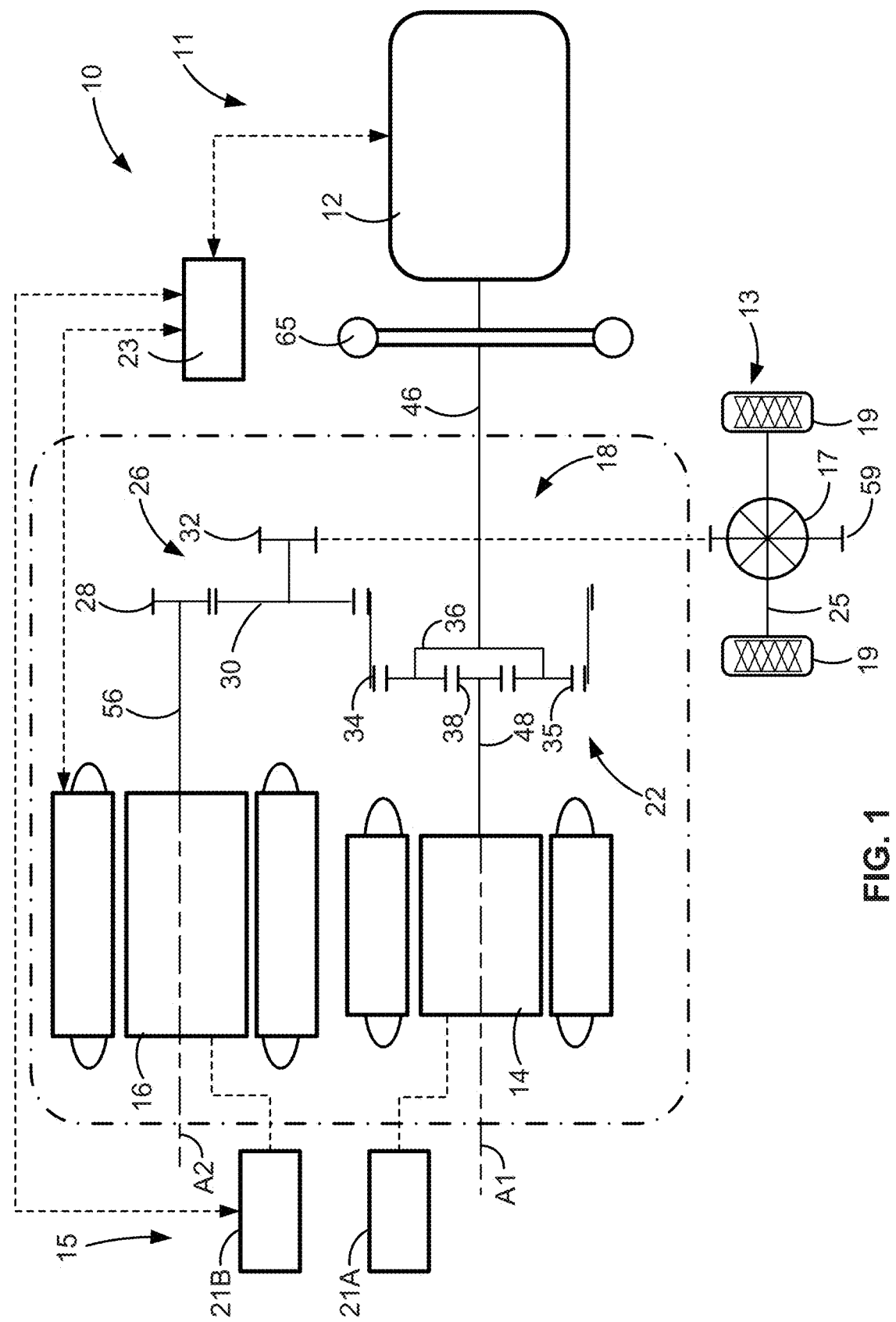
FIG. 1 is a schematic diagram illustrating a representative input split hybrid powertrain architecture in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a normal driving surface.

Referring now to the drawings, wherein like reference numbers refer to like features throughout the several views, there is shown in FIG. 1 a schematic illustration of a representative vehicle, which is designated generally at 10 and portrayed herein for purposes of discussion as a hybrid electric passenger vehicle having a passenger compartment. In accord with a more specific, non-limiting example, a hybrid powertrain 11 or architecture is a single-mode, power-split hybrid electric powertrain with an engine 12 and two multiphase brushless permanent magnet (PM) motors 14 and 16 that are mounted to an electrically variable transmission (EVT) 18. The illustrated vehicle 10—also referred to herein as "motor vehicle" or "vehicle" for short—is merely an exemplary application with which novel aspects and features of this disclosure can be practiced. In the same vein, implementation of the present concepts into a dual-mode, power-split hybrid electric powertrain should also be appreciated as an exemplary application of the novel concepts disclosed herein. As such, it will be understood that aspects and features of the disclosure can be applied to other electric-drive powertrain configurations, such as dual-mode power-split hybrid electric powertrains, and utilized for logically relevant type of motor vehicle. Lastly, select components have been shown and will be described in additional detail herein. Nevertheless, the vehicles and battery systems discussed below can include numerous additional and alternative features, and other commercially available peripheral components, e.g., for carrying out the various methods and functions of this disclosure.

The hybrid powertrain 11 of FIG. 1 may be designed to launch and propel the vehicle 10, to operate the vehicle in speed ranges between low and high road speeds, and to power the onboard vehicle electronics. An "electrically variable transmission," as shown in the drawings, comprises a transmission planetary gear train operatively connected to each of the engine 12, the first motor/generator unit (MGU) 14, and the second MGU 16. Channeling respective torques of the engine 12 and the two motor/generator units 14, 16 (referred to interchangeably as "traction motors") to different members of the planetary gear train permits one of the power sources to either assist or balance the operation of the other two power sources. Thus, the combination of an engine 12 and multiple motor/generator units 14, 16 operatively connected to the EVT 18 allows speeds and torques of the engine and motor/generators to be controlled and selected independently in order to power a subject vehicle 10 more efficiently.

The vehicle 10 is equipped with a vehicle battery system 15 that may comprise, for example, multiple battery cells arranged as battery modules that are stacked into multiple traction battery packs 21A and 21B. These battery cells may utilize suitable battery technology, including, for example, lead-acid, nickel-metal hydride (NiMH), lithium-ion ("Li-Ion"), Li-Ion polymer, zinc-air, lithium-air, nickel-cadmium (NiCad), valve-regulated lead-acid ("VRLA"), including absorbed glass mat ("AGM"), nickel-zinc (NiZn), molten salt (e.g., a Na—$NiCl_2$ battery), or combinations thereof. Each battery pack or each battery cell may be associated with one or more sensors to measure one or more battery characteristics (e.g., voltage, current, temperature, SOC, capacity, etc.) associated with each pack/cell. The vehicle battery system 15 is operatively connected to the first and second motor/generators units 14, 16 to transfer electrical current to and receive electrical current from these MGUs. Resident vehicle controller 23 is communicatively connected to the engine 12, traction motors 14, 16, vehicle battery system 15, and EVT 18 to control the operation thereof. Controller, control module, module, control unit, processor, and permutations thereof may be defined to mean one or various combinations of one or more of logic circuits, Application Specific Integrated Circuit(s) (ASIC), electronic circuit(s), central processing unit(s) (e.g., microprocessor(s)), and associated memory and storage (e.g., read only, programmable read only, random access, hard drive, tangible, etc.), combinational logic circuit(s), input/output circuit(s) and devices, etc., whether resident, remote, or a combination of both.

Vehicle controller 23 may be integrated circuit (IC) hardware programmed to execute one or more software or firmware programs or routines, e.g., using appropriate signal conditioning and buffer circuitry, and other components to provide the described functionality. Software, firmware, programs, instructions, routines, code, algorithms and similar terms may be defined to mean a controller-executable instruction sets, including calibrations and look-up tables. A controller may be designed with a set of control routines executed to provide one or more desired functions. Control routines are executed, such as by a central processing unit, and are operable to monitor inputs from sensing devices and other networked control modules and execute control and diagnostic routines to control operation of devices and actuators. Routines may be executed in real-time, continuously, systematically, sporadically and/or at regular intervals, for example, each 100 microseconds, 3.125, 6.25, 12.5, 25 and 100 milliseconds, etc., during ongoing vehicle use. Alternatively, routines may be executed in response to an occurrence of an event during operation of the vehicle 10.

Selectively operable as a continuously variable power transmission, EVT 18 of FIG. 1 includes a planetary gear set (PGS) 22 and a gear-train 26 and helps to define the input split hybrid powertrain 11 architecture. In this regard, the PGS 22 includes a ring gear 34, a planet carrier 36, and a sun gear 38. Planet gears 35 is/are intermeshed with the ring gear 34 and mounted on the planet carrier member 36, while the sun gear 38 is intermeshed with the planet gears 35 and concentrically aligned with the ring gear 34 such that the ring gear 34, and the planet gears 35 and the carrier member 36 rotate around an axis of rotation of the sun gear 38. In the illustrated example, the ring gear 34 of the PGS 22 includes a radially inner set of teeth intermeshed with the planet gears 35 located on a first portion 50 of the ring gear 34 and a radially outer set of teeth in engagement with a transfer gear-train 26 located on a second portion 52 of the ring gear 34.

As shown in FIG. 1, the engine 12 and the first motor/generator unit 14, or at least the respective torque-transmitting output shafts thereof, may be disposed for rotation on a common first axis of rotation A1. Conversely, the second motor/generator unit 16, or at least the torque-transmitting output shaft thereof, may be disposed for rotation on a second axis of rotation A2. According to the illustrated example, the first axis A1 is substantially parallel to and offset from the second axis A2. The gear-train 26 of FIG. 1 is configured to operatively connect the second motor/generator unit 16 to the PGS 22 at a corresponding junction point.

Figure 2:
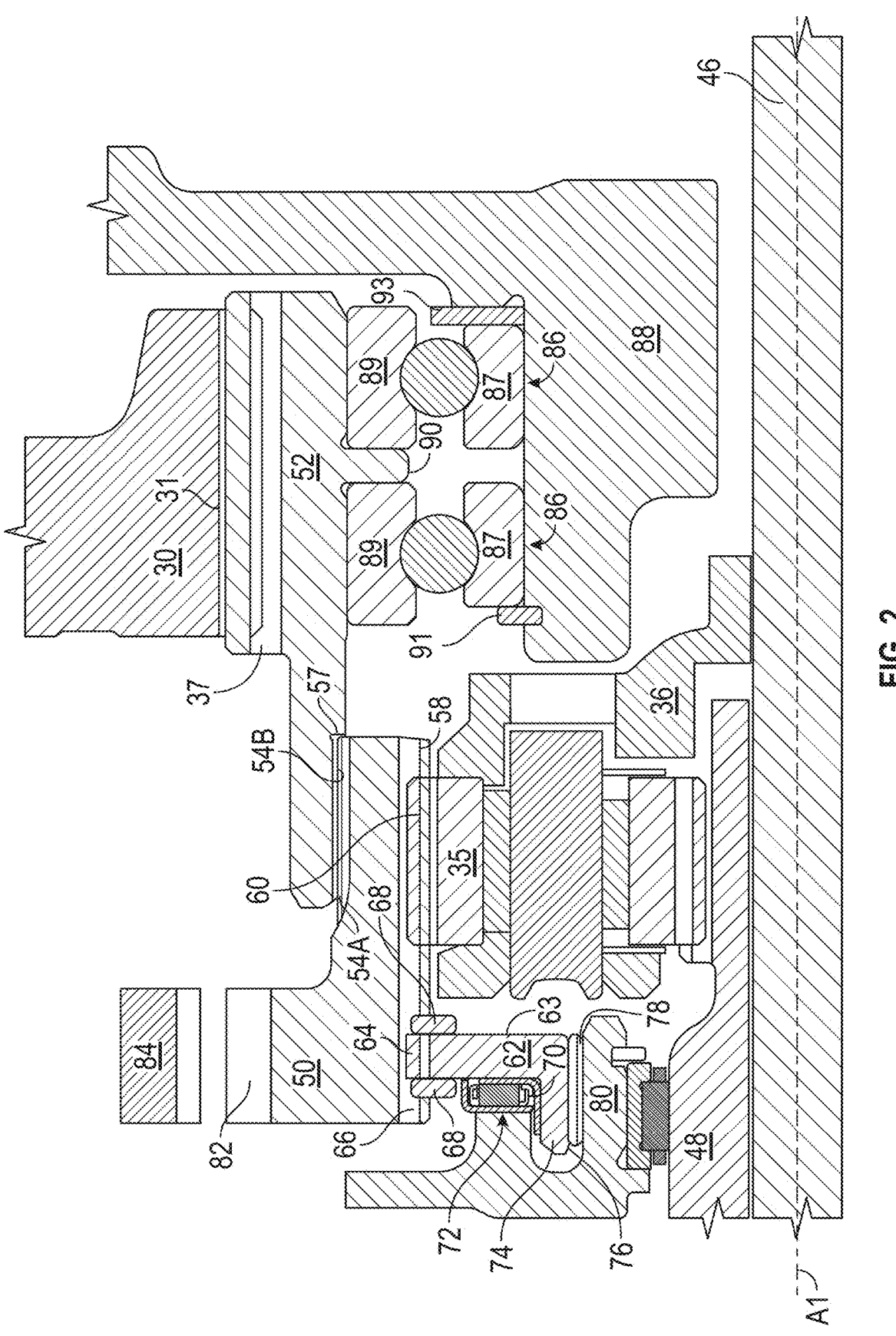
FIG. 2 is a cross-sectional view of a ring gear from the input split hybrid powertrain architecture of FIG. 1.

Engine 12, first MGU 14, and second MGU 16 are operatively connected to the EVT 18 via input member arrangements that transmit torque between the tractive power sources and the PGS 22. By way of non-limiting example, the input member arrangement includes: an engine output shaft of the engine 12, which serves as an engine input/output member 46; a rotor of the first MGU 14, which serves as a first motor input/output member 48; and a rotor of the second MGU 16, which serves as a second motor input/output member 56. The engine input/output member 46 provides engine torque to the EVT 18, whereas motor input/output members 48, 56 provide torque from their respective motor/generator units 14, 16 to the EVT 18. A damper assembly 65, which is operatively connected to the input/output shaft 46 of the engine 12, is configured to absorb torsional vibrations generated by the engine 12 before such vibrations can be transmitted to the PGS 22 of EVT 18. The input/output shaft 46 can be attached to the carrier 36 with a splined connection (FIGS. 1-2).

The gear-train 26 includes a motor B pinion (MBP) 28 configured to rotate with the second motor input/output member 56 and the MBP 28 is in meshing engagement with a transfer gear 30. The transfer gear 30 is supported for rotation on a final drive pinion (FDP) 32. As shown in FIG. 2, the transfer gear 30 includes teeth 31 in meshing engagement with radially outer teeth 37 on the ring gear 34.

The EVT 18 also includes a final drive ring (FDR) 59 shown in direct mechanical engagement with the FDP 32 with a dashed line for ease of illustration. To propel the vehicle 10, the FDP 32 and the FDR 59 transmits torque to a final drive system 13, which is represented herein by differential 17, drive wheels 19 and axle 25. Regenerative braking may be achieved by transferring torque from the final drive system 13 to the MGUs 14, 16 when operating in an electric generator mode.

In the example depicted in FIG. 1, the engine 12 may be an available or hereafter developed engine, such as a two or four-stroke compression-ignited diesel engine or a four-stroke spark-ignited gasoline or flex-fuel engine, which is readily adapted to provide its available power output typically at a number of revolutions per minute (RPM). Although not explicitly portrayed in FIG. 1, it should be appreciated that the final drive system 13 may take on an available configuration, including front wheel drive (FWD) layouts, rear wheel drive (RWD) layouts, four-wheel drive (4WD) layouts, all-wheel drive (AWD) layouts, etc.

FIG. 2 illustrates an expanded view of the intersection of the gear-train 26 and the PGS 22. The ring gear 34 includes a first portion 50 axially spaced from a second portion 52 along the axis of rotation A1. The first portion 50 includes a splined connection 54A on a radially outer surface that engage a corresponding spined connection 54B on a radially inner surface of the second portion 52 that allows for axial movement of the first portion 50 relative to the second portion 52. Furthermore, the second portion 52 includes a shoulder 57 that limits axial movement of first portion 50 towards and the second portion 52. In this disclosure, the use of axial or axially and radial or radially in relation to the ring gear 34 are in relation to the axis of rotation A1 unless stated otherwise as the ring gear 34 rotates concentrically around the axis of rotation A1.

The first portion 50 of the ring gear 34 includes a radially inner surface having teeth 58, such as helical teeth, that are in meshing engagement with teeth 60, such as corresponding helical teeth, on each of the planet gears 35 of the PGS 22. A ring piloting hub 62 is utilized to limit axial movement in a first axial direction of the first portion 50 as well as radial movement during parking. The ring piloting hub 62 forms a circumferential ring around the axis of rotation A1. A radially outer end of the ring piloting hub 62 includes a splined surface 64 that engages a corresponding splined surface 66 adjacent to an axial end of the first portion 50 of the ring gear 34. A pair of retainers 68, such as snap rings, are located within grooves in the first portion 50 to prevent axial movement of the ring piloting hub 62 relative to the first portion 50. Alternatively, a shoulder could be formed in the first portion 50 to replace one of the retainers 68.

The ring piloting hub 62 includes a radially extending portion 63 having an axially facing surface 70 that engages bearings 72, such as Torrington bearings, which accept an axial load to limit axial movement of the first portion 50 in the first axial direction. The helical teeth associated with the ring gear 34 are configured to bias the first portion 50 into the shoulder 57 when the hybrid powertrain 11 is driven by the engine 12 or into the bearings 72 during regeneration with the first MGU 14.

The ring piloting hub 62 also includes an axially inner flange 74 having a radially inner surface 76 relative to the axis of rotation A1. A bushing 78 is press fit into the opening defined by the radially inner surface 76 such that the bushing 78 does not rotate relative to the ring piloting hub 62. In one example, the bushing 78 is a high clearance bushing having a clearance of two to three times a clearance of a low clearance bushing relative to a protrusion on the static structure 80.

One feature of the bushing 78 being a high clearance bushing is a reduction in drag between the bushing 78 and a static structure 80 while the ring gear 34 is rotating. In the illustrated example, the static structure 80 can include a housing or a portion of a case structure for the hybrid powertrain 11. Additionally, the bushing 78 can be a high clearance bushing because the first portion 50 of the ring gear 34 is isolated from radial loads from the gear-train 26 as explained in greater detail below. However, the first portion 50 may expedience a radial load due to the first portion 50 including parking engagement teeth 82 that surround a radially outer side of the first portion 50 on an opposite axial end from the splined connection 54A. One or more of the parking engagement teeth 82 may engage a parking pawl 84 when the vehicle 10 is placed in park. However, the radial load is only experienced when the hybrid powertrain 11 is in park and the ring gear 34 is not rotating.

The second portion 52 of the ring gear 34 is supported by a first bearing 86 and a second bearing 86. In the illustrated example, the first and second bearings 86 are ball bearings. However, other types of bearing could be used, such as thrust bearings that are capable of carrying axial and radial loads. The first and second bearings 86 each include a radially inner race 87 that is fixed from moving relative to a static structure 88 and a radially outer race 89 that is fixed to and rotates with the second portion 52. The static structure 88 can include a housing or a portion of a case structure for the hybrid powertrain 11. The static structure 80 and the static structure 88 can also be part of the same structure or fixed from moving relative to each other. The radially inner race 87 on the first bearing 86 includes an axial surface that engages a retainer 91 or snap ring and a radially inner race 87 on the second bearing 86 includes an axial surface facing an opposite direction that engages one of a shim 93 or a portion of the static structure 88. Although two bearings 86 are illustrated, only a single bearing 86 could be utilized in this disclosure.

The second portion 52 of the ring gear 34 includes a thrust projection 90 that extends radially inward axially between opposing axially facing surfaces on the outer races 89 of each of the bearings 86. The thrust projection 90 engages the opposing axial surfaces of the outer races 89 to manage axial or thrust loads experienced by the second portion of the ring gear 34. In particular, thrust forces may result in second portion 52 as a result of the motor 12 or the MGU 14 being utilized for driving or regen, respectively. One feature of the thrust projection 90 used in connection with the bearings 86 is that the bearings 86 allow the first portion 50 and the second portion 52 to be piloted independently from each other by having the second portion 52 carry thrust loads separately. The bearings 86 also carry radial loads on the second portion 52 such that radial loads from the gear-train 26 are not transferred between the first portion 50 and the second portion 52. While the thrust projection 90 is illustrated as being integral with the second portion 52, the thrust projection 90 could be a separate component from the second portion 52, such as by locating a retainer in a groove of the second portion 52.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure is not limited to the particular embodiments disclosed but will include embodiments falling within the scope thereof.

What is claimed is:

1. An assembly, comprising:
   a housing;
   a planetary gear set located within the housing, wherein the planetary gear set includes:
      a sun gear configured to be driven by a first motor/generator unit and rotate about a first axis of rotation;
      a plurality of planet gears surrounding the sun gear and are in meshing engagement with the sun gear;
      a carrier supporting each of the plurality of planet gears to rotate around their respective axes in addition to the first axis of rotation;
      a ring gear surrounding the plurality of planet gears, wherein the ring gear includes:
         a first portion includes a first splined connection and a radially inner set of teeth in meshing engagement with the plurality of planet gears; and
         a second portion includes a radially outer set of teeth and a second splined connection in engagement with the first splined connection to allow for axial movement the first portion relative to the second portion;
      a ring piloting hub having a radially outer portion in engagement with the first portion of the ring gear; and
      at least one bearing having an inner race fixed relative to the housing and an outer race fixed to the second portion of the ring gear.

2. The assembly of claim 1, wherein the second portion of the ring gear includes a shoulder adjacent to an end of the second splined connection for engaging the first portion of the ring gear.

3. The assembly of claim 1, including a second bearing having an inner race fixed relative to the housing and an outer race fixed to the second portion of the ring gear, where the at least one bearing is a first bearing with the first bearing and the second bearing each being ball bearings.

4. The assembly of claim 3, wherein the second portion of the ring gear includes a thrust projection extending radially inward relative to the first axis of rotation.

5. The assembly of claim 4, wherein the thrust projection includes a first axial surface in engagement with the outer race on the first bearing and a second axial surface in engagement with the outer race on the second bearing.

6. The assembly of claim 4, wherein an axial surface facing a first axial direction on the inner race of the first bearing facing is in engagement with a retainer and an axial surface facing a second axial direction on the inner race of the second bearing is in engagement with one of a shim or the housing.

7. The assembly of claim 1, wherein the first portion of the ring gear includes parking engagement teeth on a radially outer side relative to the first axis of rotation.

8. The assembly of claim 1, including a gear train having a transfer gear in meshing engagement with the radially outer set of teeth on the second portion of the ring gear.

9. The assembly of claim 1, including a second bearing having an inner race and an outer race, wherein the at least one bearing includes a first bearing, the second portion of the ring gear includes a thrust projection extending radially inward relative to the first axis of rotation, and the thrust projection includes a first axial surface in engagement with the outer race on the first bearing and a second axial surface in engagement with the outer race on the second bearing.

10. The assembly of claim 1, wherein an axial face of the ring piloting hub facing a first axial direction is configured to engage a bearing assembly located adjacent to the housing.

11. The assembly of claim 10, wherein a radially inner portion of the ring piloting hub includes an axially extending flange defining a radially inner surface with a bushing in engagement with the radially inner surface.

12. The assembly of claim 11, wherein a radially inner surface of the bushing surrounds a protrusion on the housing and the bushing is a high clearance bushing.

13. The assembly of claim 10, wherein the radially outer portion of the ring piloting hub forms a splined connection with a radially inner surface of the first portion of the ring gear.

14. A hybrid drive comprising:
an engine configured to drive an engine input/output member along a first axis of rotation;
a first motor/generator unit configured to drive a first input/output member along the first axis of rotation;
a second motor/generator unit configured to drive a second input/output member along a second axis parallel to and spaced from the first axis;
a planetary gear set located at least partially within a housing, wherein the planetary gear set includes;
a sun gear configured to be driven by the first input/output member;
a plurality of planet gears surrounding the sun gear and are in meshing engagement with the sun gear;
a carrier supporting each of the plurality of planet gears to rotate around their respective axes in addition to the first axis of rotation, wherein the carrier is configured to be driven by the engine input/output member;
a ring gear surrounding the plurality of planet gears, wherein the ring gear includes:

a first portion includes a first splined connection and a radially inner set of teeth in meshing engagement with the plurality of planet gears; and
a second portion includes a radially outer set of teeth and a second splined connection in engagement with the first splined connection to allow for axial movement of the first portion relative to the second portion; and
at least one bearing having an inner race fixed relative to the housing and an outer race fixed to the second portion of the ring gear; and
a second bearing having an inner race and an outer race, wherein the at least one bearing includes a first bearing, the second portion of the ring gear includes a thrust projection extending radially inward relative to the first axis of rotation, and the thrust projection includes a first axial surface in engagement with the outer race on the first bearing and a second axial surface in engagement with the outer race on the second bearing.

15. The hybrid drive of claim 14, wherein the second portion of the ring gear includes a shoulder adjacent to an end of the second splined connection for engaging the first portion of the ring gear.

16. The hybrid drive of claim 14, including a ring piloting hub having a radially outer portion in engagement with the first portion of the ring gear, wherein an axial surface of the ring piloting hub facing a first axial direction is configured to engage a bearing assembly located adjacent to the housing and a radially inner portion of the ring piloting hub includes an axially extending flange defining a radially inner surface with a bushing in engagement with the radially inner surface.

17. The hybrid drive of claim 16, including a gear train having a transfer gear in meshing engagement with the radially outer set of teeth on the second portion of the ring gear.

18. The hybrid drive of claim 14, including a ring piloting hub having a radially outer portion in engagement with the first portion of the ring gear.

19. A vehicle comprising:
a passenger compartment supported by a plurality of wheels;
a hybrid drive assembly configured to drive at least one of the plurality of wheels, wherein the hybrid drive assembly includes:
a housing;
a planetary gear set located within the housing, wherein the planetary gear set includes:
a sun gear configured to be driven by a first motor/generator unit and rotate about a first axis of rotation;
a plurality of planet gears surrounding the sun gear and are in meshing engagement with the sun gear;
a carrier supporting each of the plurality of planet gears to rotate around their respective axes in addition to the first axis of rotation;
a ring gear surrounding the plurality of planet gears, wherein the ring gear includes:
a first portion includes a first splined connection and a radially inner set of teeth in meshing engagement with the plurality of planet gears; and
a second portion includes a radially outer set of teeth and a second splined connection in engagement with the first splined connection to allow for axial movement the first portion relative to the second portion; and at least one bearing includes an inner race fixed relative to the housing and an outer race fixed to the second portion of the ring gear; and a second bearing having an inner race and an outer race, wherein the at least one bearing includes a first bearing, the second portion of the ring gear includes a thrust projection extending radially inward relative to the first axis of rotation and the thrust projection includes a first axial surface in engagement with the outer race on the first bearing and a second axial surface in engagement with the outer race on the second bearing.

20. The vehicle of claim 19, including a ring piloting hub having a radially outer portion in engagement with the first portion of the ring gear.

\* \* \* \* \*